US006923202B2

United States Patent
Enerson

(10) Patent No.: US 6,923,202 B2
(45) Date of Patent: Aug. 2, 2005

(54) MODULAR PRESSURE RELIEF VALVE

(75) Inventor: Jon R. Enerson, Port Richey, FL (US)

(73) Assignee: Halkey-Roberts Corporation, St. Petersburg, FL (US)

( * ) Notice: Subject to any disclaimer, the term of this patent is extended or adjusted under 35 U.S.C. 154(b) by 90 days.

(21) Appl. No.: 10/369,292

(22) Filed: Feb. 18, 2003

(65) Prior Publication Data

US 2003/0221728 A1 Dec. 4, 2003

Related U.S. Application Data

(60) Provisional application No. 60/384,852, filed on Jun. 1, 2002.

(51) Int. Cl.⁷ .................................................. F16K 15/06

(52) U.S. Cl. .................... 137/271; 137/540; 137/541; 251/337

(58) Field of Search ...................... 137/271, 540, 137/541; 251/86, 337

(56) References Cited

U.S. PATENT DOCUMENTS

| 287,004 | A | * | 10/1883 | Cullingworth | 137/541 |
| 4,310,017 | A | * | 1/1982 | Raines | 137/533 |
| 4,579,141 | A | * | 4/1986 | Arff | 251/86 |
| 4,834,131 | A | * | 5/1989 | Austin | 137/541 |
| 6,009,895 | A | * | 1/2000 | Wass et al. | 137/223 |

* cited by examiner

Primary Examiner—John Rivell
(74) Attorney, Agent, or Firm—Holland & Knight LLP

(57) ABSTRACT

A pressure relief valve having a modular design that allows the release pressure of the valve to be altered during assembly is provided by the present invention. The valve includes a serrated valve tube that fits inside of a valve body. A spring retainer ring fits on an outside diameter of the serrated valve tube such that it is held in position by interacting with the serrations. The release pressure of the valve is altered by changing the position of the spring retainer ring on the serrations. In addition, a variety of different spring types and configurations can be utilized in conjunction with the spring retainer ring position to select one of a large number of different release pressures for the valve during assembly.

20 Claims, 5 Drawing Sheets

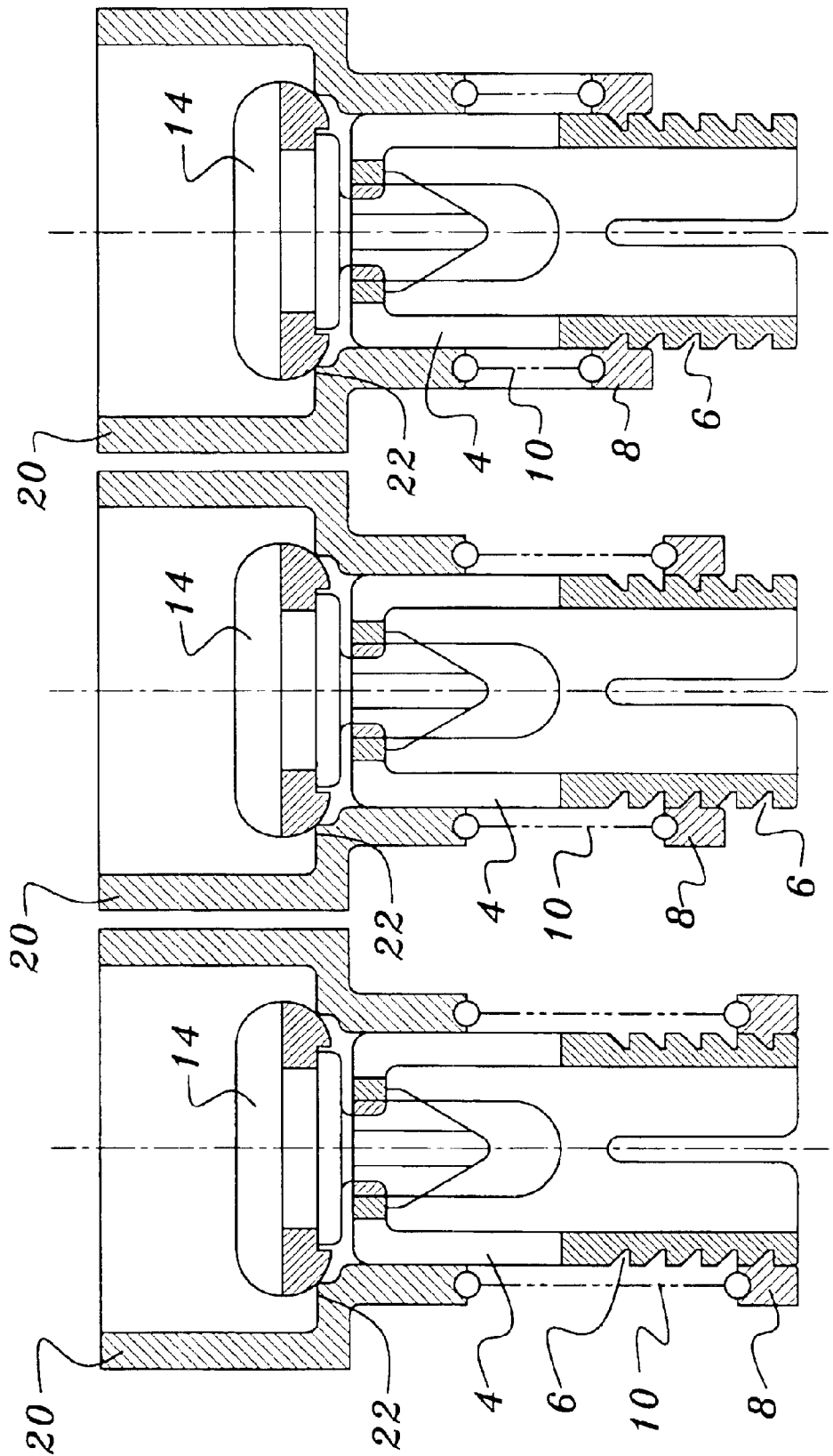

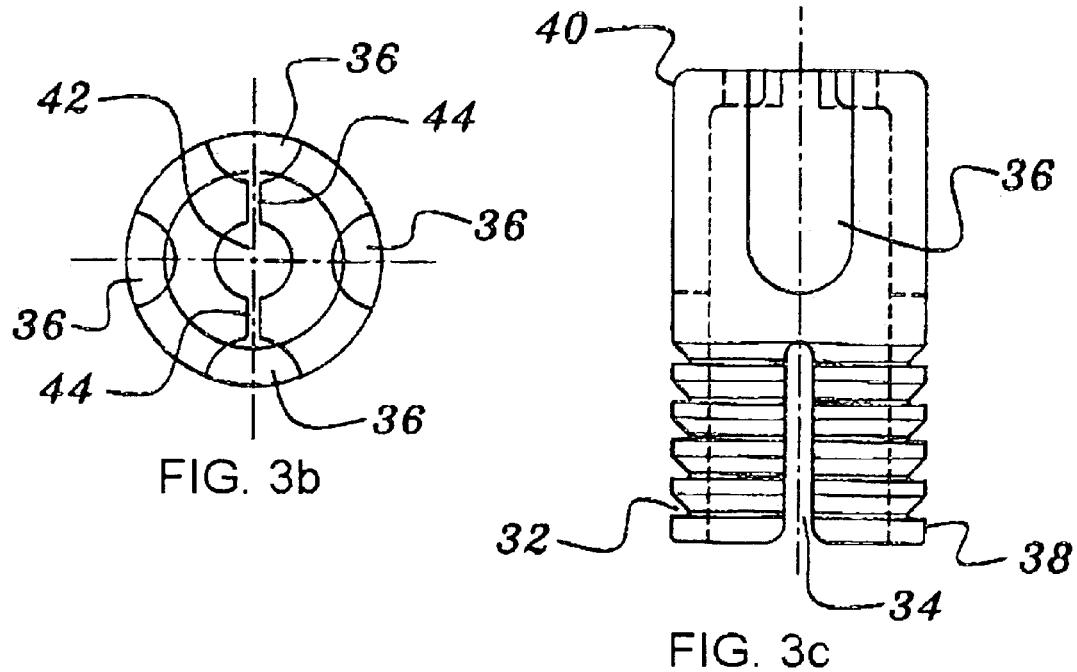
FIG. 3b
FIG. 3c
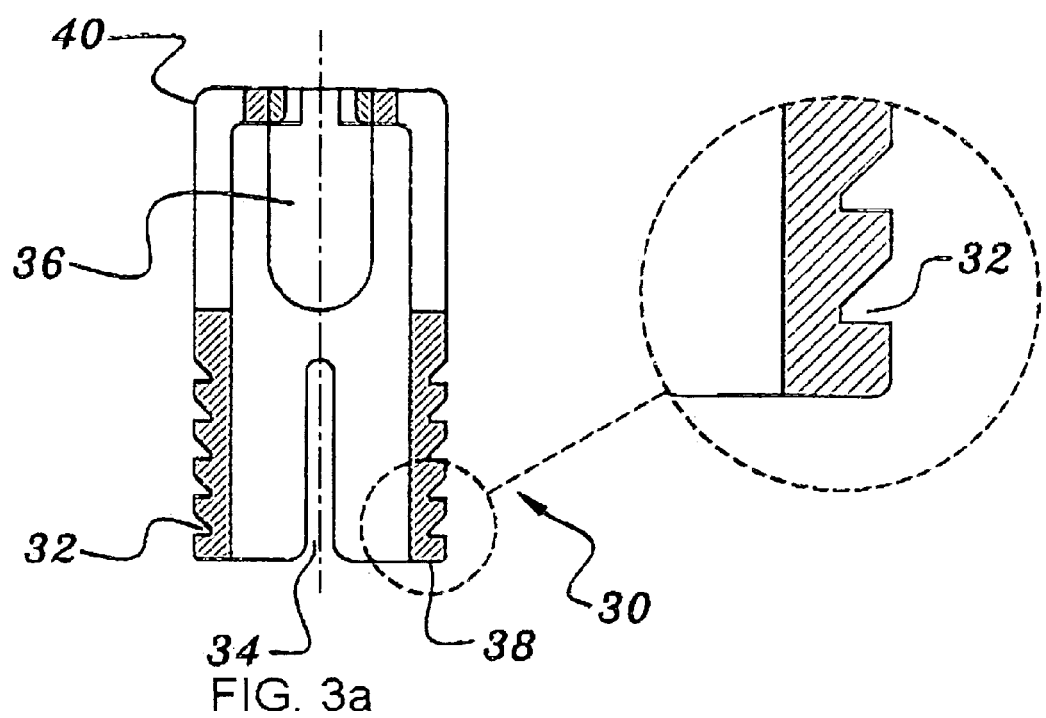
FIG. 3a

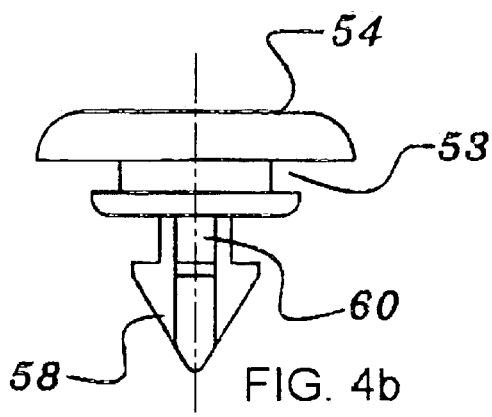
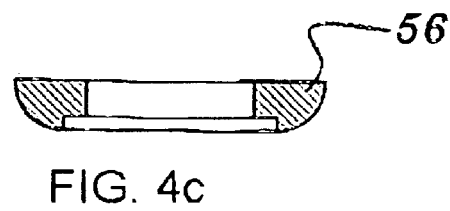
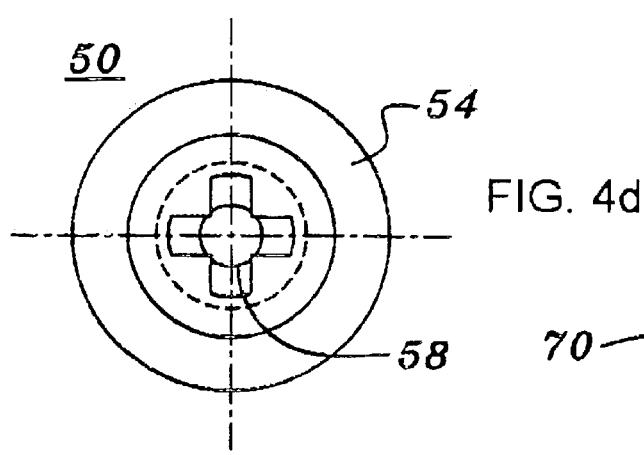
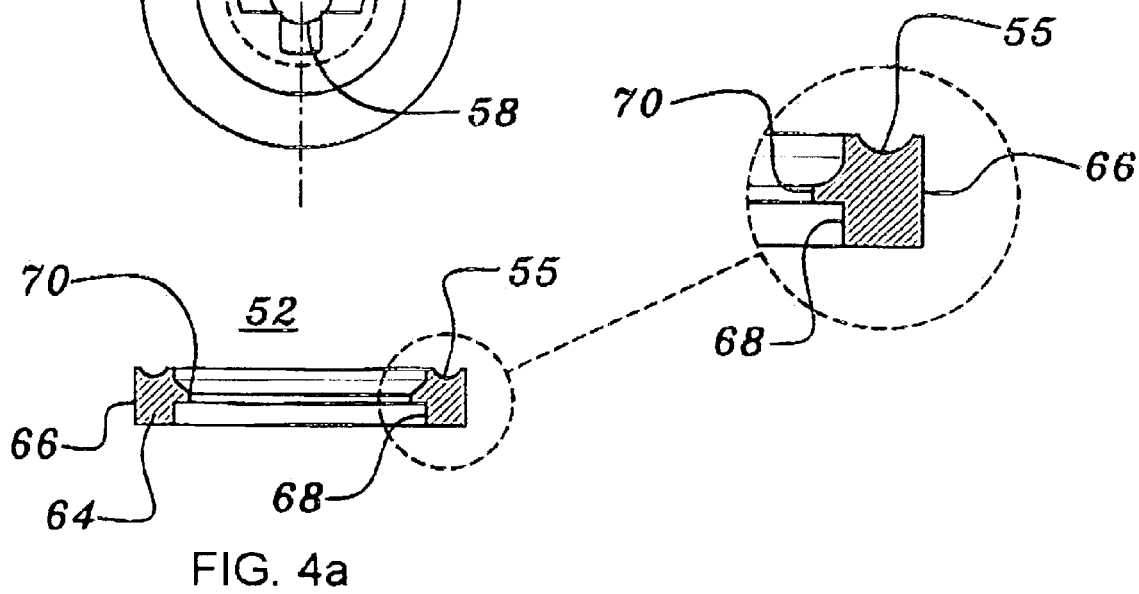
FIG. 4b
FIG. 4c
FIG. 4d
FIG. 4a

MODULAR PRESSURE RELIEF VALVE

CROSS-REFERENCE TO RELATED APPLICATIONS

This application claims the benefit of provisional application No. 60/384,852, filed Jun. 1, 2002, the disclosure of which is incorporated by reference herein.

BACKGROUND OF THE INVENTION

1. Field of the Invention

This invention relates generally to a valve for controlling the flow of fluid through a fluid channel. More particularly, the present invention is directed toward a pressure relief valve with a modular design that allows the amount of pressure required to open the valve to be easily adjusted during assembly of the valve.

2. Description of the Background Art

Presently, pressure relief valves suffer from a number of problems. One of these problems relates to the precise pressure needed to crack or open the valve. Unfortunately, actual cracking or valve opening pressures have proven to be inconsistent and not readily predictable in previous pressure relief valve designs. In many instances, this is primarily due to the valve arrangement relying on an elastomeric seal stem that is supported directly by a mechanical spring. Variations in material properties of the elastomeric seal, coupled directly with variations in the mechanical properties of the spring, result in a tolerance stack of axial load requirements for the opening operation of each valve assembly that is difficult, if not impossible, to control in series production.

Therefore, it is an object of this invention to provide an improved method and apparatus that overcomes the aforementioned inadequacies of the prior art and provides an improvement which is a significant contribution to the advancement of the pressure relief valve art.

Another object of this invention is to provide a pressure relief valve that has a release pressure that can be selected during assembly of the valve.

Another object of this invention is to provide a modular type valve that can be adjusted to be used with a variety of different types of fittings such as "T" fittings, straight tube fittings, manifolds, etc.

Another object of this invention is to provide a valve that has a release pressure that can be accurately predicted during assembly of the valve.

Another object of this invention is to provide a pressure relief valve that is suitable for medical/clinical use.

Another object of this invention is provide a valve with a self-aligning valve seal.

Another object of this invention is provide a valve with a scalable design that may be easily enlarged for higher flow and pressure applications.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

A preferred embodiment of the present invention is directed toward a pressure relief valve. The pressure relief valve includes a valve body and a serrated valve tube that is configured to be received by the valve body. A valve seal carrier is held in a desired position on one end of the serrated valve tube through the interaction of a hole in the serrated valve tube and a mating protrusion positioned on the valve seal carrier. An elastomeric valve seal is mounted in a groove on the valve seal carrier that interacts with a sealing surface on the valve body to seal the valve. A spring retainer ring is fitted over an outside diameter of the serrated valve tube. The spring retainer ring is positioned on a desired location on the serrated valve tube during assembly to set an approximate release pressure for the pressure relief valve. A deformation slot is formed on the serrated end of the serrated valve tube that allows the serrated valve tube to deform to receive the spring retainer ring. A valve spring is positioned over the outside diameter of the serrated valve tube such that the valve spring is constrained by the spring retainer ring. Slots in a valve seal carrier end of the serrated valve tube permit a fluid flow through the pressure relief valve in response to a sufficiently high pressure. The pressure relief valve is configured to receive one a variety of different types of valve springs during assembly. The type of valve spring to be utilized is selected based upon the desired release pressure of the pressure relief valve. The valve body is configured to receive external fittings such as "T" fittings or male and female luer fittings.

Another embodiment of the present invention is directed toward a pressure valve having a release pressure for controlling the flow of a fluid through a fluid channel. The valve includes a valve body having a sealing surface and a valve tube. A valve seal is mounted on the valve tube through the use of a barbed protrusion. A spring creates a force that holds the valve seal against the sealing surface. A spring tension selector allows the force created by the spring to be adjusted. Preferably, the spring tension selector is a spring retainer ring that interacts with a series of serrations positioned on the outside diameter of the valve tube to allow the force created by the spring to be selectively controlled. The spring is selected from a set of springs having a different number of coils or different gauges of wire based upon the desired release pressure of the valve. The valve body preferably has an inlet port and an outlet port respectively designed to receive a female luer fitting a male luer fitting. Alternatively, the valve body may be configured to receive barbed hose fittings.

Yet another embodiment of the present invention is directed toward a method of setting a release pressure for a pressure relief valve having a valve tube with a predetermined number of serrations during assembly. The valve tube interacts with a spring retainer ring to apply a spring generated force to a valve seal. The method commences with the selecting of a desired release pressure. A serration that corresponds to the desired release pressure is then determined based upon a prior determined relationship between the serration location and the release pressure of the pressure relief valve. The retainer ring is positioned on the determined serration. The release pressure may also be varied by selecting a spring that will be used to generate the spring force from a set of springs based upon the desired release pressure. The springs in the set have different numbers of coils and are constructed from different gauges of wires.

The above described embodiments provide a number of advantages over the prior art. The spring retainer ring works in conjunction with the serrations to allow various release pressures to be selected at the time of assembly. Further variations in the release pressure are provided through the use of modular components such as different types of springs. These, and other, advantages are more particularly described below and above.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIGS. 2(a–c) are a series of pictorial representations of an embodiment of the present invention depicting one way the relief pressure of the valve can be adjusted;

FIGS. 3a–3c are pictorial representations of a valve tube constructed in accordance with an embodiment of the present invention;

FIGS. 4a–4d are pictorial renresentations of a valve seal and spring retainer ring constructed in accordance with an embodiment of the present invention.

Similar reference characters refer to similar parts throughout the several views of the drawings.

DETAILED DESCRIPTION OF THE PREFERRED EMBODIMENT

Figure 1:
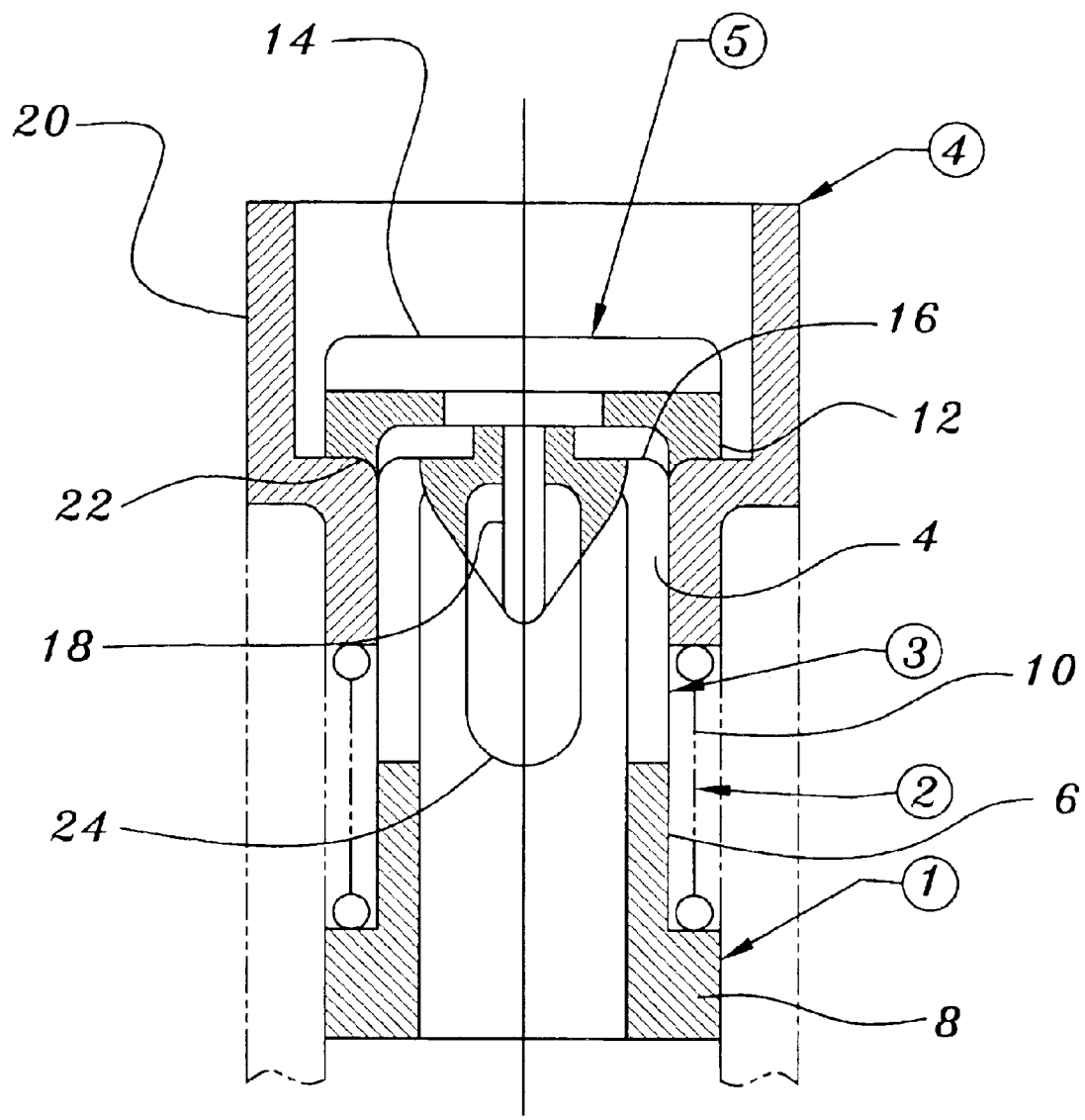
FIG. 1 is a pictorial representation of an embodiment of the present invention.

Referring now to FIG. 1, a preferred embodiment of the present invention is shown. The new relief valve 2 has a cartridge type design that consists of a serrated central valve tube 4 that has annular serrations 6 along the outside diameter of the valve tube 4. The annular serrations 6 serve as stops for a spring retainer ring 8 fitted over the outside diameter of the valve tube 4. The purpose of the multiple serrations 6 is to allow the position of the spring retainer ring 8 to be adjusted by simply snapping it into a desired axial location corresponding to a particular serration 6. Adjusting the position of the spring retainer ring 8 allows the valve spring 10 to be progressively compressed, or preloaded during assembly of the valve 2. Increasing the compression of the valve spring 10 increases the pressure required to open the valve 2. The serrations 6 utilized in the embodiment of FIG. 1 are designed to operate in one way only, axially. This prevents the spring retainer ring 8 from dislodging from its set position on the serrations 6. Placement of the valve spring 10 on the outside diameter of the serrated valve tube 4 is beneficial in that it keeps the valve spring 10 out of the fluid flow path of the valve 2.

Various springs with larger or smaller wire diameter, varying numbers of coil windings, or various free lengths, can be used as the valve spring 10. This, coupled with the adjustability of the spring retainer ring 8, provides a wide variety of potential valve 2 operating pressures. Adjustment of the spring retainer ring 8 may also allow for compensation of differences in the release pressure of the valve 2 due to valve springs 10 that have broad manufacturing tolerances. Preferably, springs are utilized that have a standard configuration of different pitch diameters, free lengths, and wire diameters. For example, the springs may use wires having diameters that vary in 0.001 in. increments from 0.010 in. thru 0.032 in. and six different variations in the number of active coils windings from three thru ten active coils. These different spring types are charted with incremental retainer rings settings to provide an assembled preload for each listed spring. The valve assembly 2 shown in FIG. 1 provides five selections of fixed retainer ring settings which, when coupled with the 176 spring configurations possible in accordance with the above example, yields 880 possible selections of valve operating pressures. Thus, by varying the serration setting of the spring retainer ring 8 and the type of spring utilized as the valve spring 10, the valve 2 of FIG. 1 can be configured to have a substantial number of different release pressures. Although predetermined data charts can be used to estimate the release pressure of the valve 2, the actual operating pressure should still be subjected to test verification in applications where the release pressure value is crucial.

Valve sealing for the valve 2 of FIG. 1 is accomplished by means of an elastomeric ring 12 that is mounted onto a "floating" or self-aligning valve seal carrier 14. The valve seal carrier 14 is capable of 7 degrees, (14 degrees total), movement. The valve seal carrier 14 is held entrapped through a crosscut slot and clearance hole 16 arrangement in the proximal end of the serrated valve tube 6. A spiked and barbed end 18 on the valve seal carrier 14 component allows it to be simply snapped into the valve tube 6 at assembly. In its normally closed position in assembly, the valve tube 6 is prevented from expanding or deflecting to release the valve seal carrier 14 by being cylindrically constrained by the inside diameter of the valve cartridge body 20. When closed, the elastomeric valve seal 12 material is held compressed against an annular seal surface 22 inside the valve cartridge body 20. The valve 2 opens when fluid pressure overcomes the spring tension and forces the valve seal carrier 14 and valve tube 4 to move axially away from the valve seat 22. Fluid flow is permitted by way of four equally spaced longitudinal slots 24 in the distal end of the serrated valve tube 4. By this arrangement, fluid pressure acts directly on the valve seal components 12 and 14 that in turn respond directly to the mechanical force of the valve spring 10.

The embodiment of the present invention shown in FIG. 1 offers a number of advantages over the prior art. The modular design of the valve allows the characteristics of the valve to be easily altered by simply modifying a selected component. Thus, an array of "standard" components can be utilized to provide pressure relief valves that are responsive to a wide variety of pressures. Furthermore, final assembly of the pressure relief valve cartridge 2, (irrespective of the compression molded integral valve seal), preferably requires no adhesive bonding or plastic welding. In such an embodiment, all of the components of the cartridge 2 snap into place. Assembly of the relief valve cartridge 2 to other components, such as a "T" fitting, may be accomplished by either adhesive or weld bonding processes Referring now to FIGS. 2(a–c), a more detailed description of the operation of a spring retainer ring 8 constructed in accordance with an embodiment of the present invention is shown. The valve spring 10 is selected such that the valve seal carrier 14 is held against the valve 22 seat when no pressurized fluid is present in the serrated valve tube 4. Otherwise, the valve 2 would always be in the open position as it would require zero additional pressure to open the valve 2. When the spring retainer ring 8 is positioned low with regard to the serrations 6 on the valve tube 4 as shown in FIG. 2(a), the pressure required to lift the valve seal carrier 14 off of the valve seat 22 is relatively low. This is because the valve spring 10 is only slightly compressed when the spring retainer ring 8 is placed low on the serrated tube 4 as shown in FIG. 2(a). Thus, the resistance of the valve spring 10 to further compression is also relatively low. In FIG. 2(b), the spring retainer ring 8 has been moved two serrations 6 higher on the valve tube 4. The raising of the spring retainer ring 8 on the serrated valve tube 4 has compressed the valve spring 10 such that a comparatively larger force is required to lift the valve seal carrier 14 off of the valve seat 22. Thus, the release pressure of the pressure relief valve 2 has been increased. Finally, FIG. 2(c) depicts the spring retainer ring 8 positioned on the highest serration 6 of the serrated valve tube 4. In the position of FIG. 2(c), the valve spring 10 is compressed more than in either FIG. 2(a) or FIG. 2(c). Thus, the valve of FIG. 2(c) will require the highest fluid pressure to lift the valve seal carrier 14 off of the valve seat 22 and, thus, open the valve.

Referring now to FIG. 3 a most preferred valve tube 30 for use in accordance with an embodiment of the present invention is shown. The valve tube 30 is preferably a polymer molded component, comprising a hollow cylindrical shape. Five axially spaced serrations 32 on the distal end 38 of the tube provide a mechanical interlock for a mating spring retainer ring such as described in more detail in FIG. 4. Two equally spaced longitudinal slots 34 through the serrations 32 allow circumferential distortion of the tube 30 to permit the spring retainer ring to snap into each axially spaced serration 32. The proximal end 40 of the tube 30 has four equally spaced slots 36 that extend over the proximal end 40 to provide a passage for fluid flow. A central hole 42 on the proximal end 40, and biased slots 44 through this hole, provide mechanical engagement for the valve seal carrier 14 and seal assembly 12 shown in FIG. 1 and discussed in more detail in FIG. 4. The outside diameter of the proximal end 40 of the tube 30 is sized to provide a slip fit with the inside diameter of the valve cartridge body component 20 shown in FIG. 1. In it's normally closed position in assembly the proximal end 40 of the valve tube 30 is prevented from deflecting outward and releasing the valve seal carrier 14 by the inside diameter of the valve cartridge housing 20.

Referring now to FIG. 4, embodiments of a valve seal carrier 50 and a spring retainer ring 52 for use with an embodiment of the present invention are shown. The valve seal carrier 50 is preferably a molded polymer component, comprising a round disc or button shaped proximal end 54, which acts as a rigid backing for the elastomeric seal material 56 that attaches into a groove 53 describing the periphery under the disc. This groove 53 is of a size so as to slightly stretch the elastomeric seal material 56 causing it to be prevented from easily becoming disengaged from the seal carrier 50. The distal end of the seal carrier 50 is comprised of a four-fluted pointed barb arrangement 58 with a short length of supporting shaft 60 attaching it to the head 54 of the seal carrier 50. This barbed end 58 provides a means to insert the seal carrier 50 into the valve tube 30, secure it in assembly with the valve tube 20, and allow several degrees of angular displacement, so as to be self-aligning with the seal surface 22 of the valve cartridge body 20. The seal carrier 50 and elastomeric seal function 56 in assembly to move axially in response to fluid pressure, move away from the seal surface 22 of the valve cartridge body 20 and permit the conduction of fluid.

The spring retainer ring 52 is preferably an uninterrupted torroidal shape 64 constructed of injection molded polymer material. The ring 64 comprises a smooth outer diameter surface 66 that acts as a slip fit diameter with any of several different valve housing configurations such as T-valves or straight tubes. The inside diameter 68 of the ring 52 features a raised angular rib 70 that functions as a locking engagement with the serrations 32 on the distal end 38 of the valve tube 30. This rib 70 is shaped to permit the ring 52 to move only toward the proximal end 40 of the valve tube 30 to prevent disengagement of the ring 52 and subsequent loss of the desired spring pressure. The spring retainer ring 52 has a groove 55 that engages the helical spring 10 in assembly and is also used to compress the spring 10 to the desired preloaded compressed length to determine the valve operating, (cracking) pressure. The retainer ring 52 is preferably assembled with the valve tube 30 by simply snapping it progressively to the desired axial serration 32 on the tube 30 to establish the desired compressed length, (and pre-load pressure), of the mechanical spring 10.

Figures 5A, 5B:
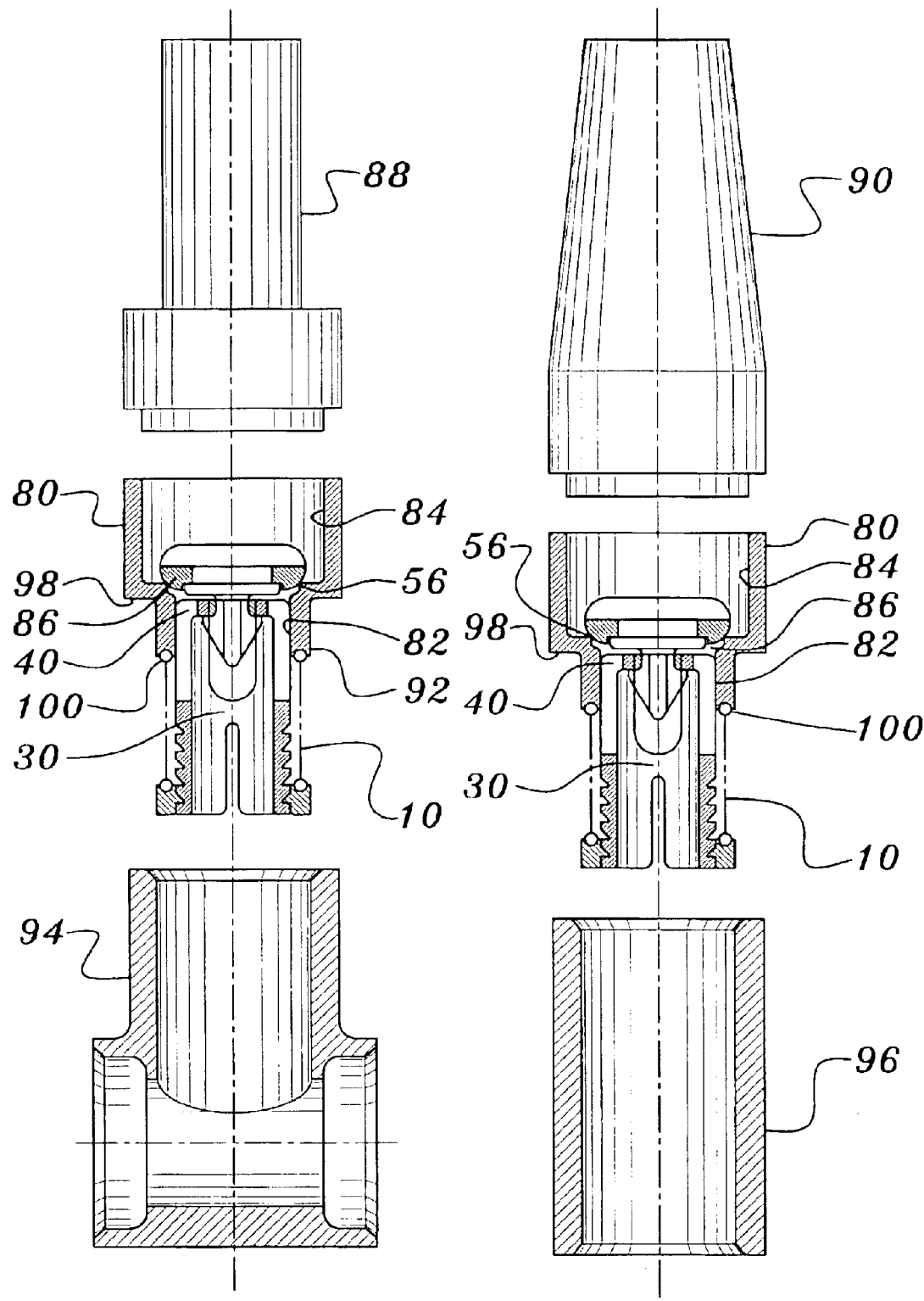
FIG. 5 is a pictorial representation of a valve cartridge body and various types of fittings.

Referring now to FIG. 5, the valve cartridge housing 80 is described in more detail. A molded polymer component, the valve cartridge housing 80 provides an inside diameter 82, slip fit with the proximal end 40 of the valve tube 30, to function as a guide within which the valve tube 30 may move axially in response to opening pressure exerted on the valve seal and carrier assembly 50 to which the tube 30 is attached. A larger inside diameter 84 of the housing has, at it's distal end, a stepped surface 86 that functions as a seal interface with the elastomeric seal 56, prohibiting the passage of fluid through the valve in it's closed position. The proximal end of the valve cartridge housing 80 provides a locating inside diameter 84 and mating surface to which a variety of standard end connection fittings such as straight tube fittings 88, luer fittings 90, or barbed tubing connections (not shown) may be attached permanently to the housing 80. Sonic welding, thermal welding, appropriate adhesives or other means may accomplish attachment of these fittings to the housing 80. The distal end of the valve cartridge housing 80 comprises an outside diameter 92 configured to act as a locating diameter with any of a variety of valve body shapes such as a "T" 94, straight tube 96, or manifold (not shown) or any component that includes appropriate mating features to accommodate the valve cartridge 80. The outside diameter 92 of the distal end terminates toward the proximal end in an interface surface 98 that provides a suitable surface for sonic or thermal welding, or adhesive or other permanent bonding with a mating component. The extreme distal end of the cartridge housing 80 terminates in a supporting surface 100 that functions as a stop for the mechanical spring 10.

The valve spring 10 is preferably a helical wound wire, compression spring, with un-ground squared ends. The spring 10 functions to exert pressure against the valve seal 56 to biased it toward a closed position. In reaction to fluid pressure, the valve seal and carrier assembly 50 move axially from a closed position in the cartridge housing 80, compressing the spring 10 between the retainer ring 8 and the distal end of the valve cartridge housing 80. A variety of different compression springs 10, composed of different wire diameters, number of coils and uncompressed, (free), lengths may be interchanged in the valve cartridge assembly. The size of the spring 10 is limited to a wire diameter that does not exceed the distance defined by the outside diameter of the valve tube 30 and the smaller outside diameter of the valve cartridge body 80. As needed, the spring wire 10 material may be selected to be an appropriate and approved material, such as stainless steel, for medical applications. In practice, an assortment of various sized springs 10 are categorized and charted with respect to spring size and axial location of the spring retainer ring 8 in assembly to determine the operating pressure, (cracking pressure), of the assembled valve cartridge.

In addition to the above discussed features, the present invention disclosure also includes the subject matter contained in the appended claims. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A pressure relief valve, said valve comprising:
   a valve body;
   a serrated valve tube configured to be received by the valve body;
   a valve seal carrier held in a desired position on one end of the serrated valve tube;
   a spring retainer ring fitted over an outside diameter of the serrated valve tube wherein the spring retainer ring is positioned on a desired location on the serrated valve tube during assembly to set an approximate release pressure for the pressure relief valve; and
   a valve spring positioned over the outside diameter of the serrated valve tube such that the valve spring is constrained by the spring retainer ring.

2. The pressure relief valve of claim 1 further comprising an elastomeric valve seal mounted on the valve seal carrier that is held against a sealing surface on the valve body through the interaction of the valve spring, the spring retainer ring and the valve body to seal the pressure relief valve.

3. The pressure relief valve of claim 2 wherein the valve seal carrier further comprises a groove for receiving the elastomeric valve seal.

4. The pressure relief valve of claim 1 further comprising a deformation slot formed on a serrated end of the serrated valve tube that allows the serrated valve tube to deform to receive the spring retainer ring.

5. The pressure relief valve of claim 1 wherein the serrated valve tube further comprises slots in a valve seal carrier end of the serrated valve tube that permit a fluid flow through the pressure relief valve in response to a sufficiently high pressure.

6. The pressure relief valve of claim 1 wherein the valve seal carrier is held on the serrated valve tube through the interaction of a hole in the serrated valve tube and a mating protrusion positioned on the valve seal carrier.

7. The pressure relief valve of claim 1 wherein the pressure relief valve is configured to receive one a variety of different types of valve springs during assembly and the type of valve spring is selected based upon the desired release pressure of the pressure relief valve.

8. The pressure relief valve of claim 1 wherein the valve body is configured to receive a "T" fitting.

9. The pressure relief valve of claim 1 wherein the valve body is configured to receive male and female luer fittings.

10. A pressure valve having a release pressure for controlling the flow of a fluid through a fluid channel: said valve comprising:
    a valve body having a sealing surface:
    a valve tube:
    a valve seal mounted on the valve tube:
    a spring for creating a force that holds the valve stem against the sealing surface: and
    a spring tension selector that allows the force created by the spring to be adjusted, spring tension selector further comprising a spring retainer ring that interacts with a series of serrations positioned on the outside diameter of the valve tube to allow the force created by the spring to be selectively controlled.

11. The valve of claim 10 wherein the valve seal is mounted on the valve tube through the use of a barbed protrusion.

12. The valve of claim 10 wherein the spring is selected from a set of springs having different number of coils and wherein the spring is selected from the set of springs based upon the desired release pressure of the valve.

13. The valve of claim 10 wherein the spring is selected from a set of springs constructed from different gauge wires and wherein the spring is selected from the set of springs based upon the desired release pressure of the valve.

14. The valve of claim 10 wherein the valve body further comprises an inlet port and an outlet port and wherein one of the ports is designed to receive a female luer fitting and one of the ports is designed to receive a male luer fitting.

15. The valve of claim 10 wherein the valve body is configured to connect to a "T" fitting.

16. The valve of claim 10 wherein the valve body is configured to receive barbed hose fittings.

17. A method of setting a release pressure for a pressure relief valve having a valve tube with a predetermined number of serrations during assembly that interacts with a spring retainer ring to apply a spring generated force to a valve seal, said method comprising:
    selecting a desired release pressure;
    determining a serration that corresponds to the desired release pressure based upon a prior determined relationship between the serration location and the release pressure of the pressure relief valve; and
    positioning the retainer ring on the determined serration.

18. The method of claim 17 further comprising the step of selecting a spring that will be used to generate the spring force from a set of springs wherein the spring is selected based upon the desired release pressure.

19. The method of claim 18 wherein the step of selecting a spring further comprises selecting a spring from a set of springs having different numbers of coils wherein the number of coils selected is based upon the desired release pressure of the pressure relief valve.

20. The method of claim 18 wherein the step of selecting a spring further comprises selecting a spring from a set of springs constructed from different gauges of wire and wherein the gauge of wire selected depends upon the desired release pressure of the pressure relief valve.

* * * * *